United States Patent
Yoo et al.

(10) Patent No.: US 8,073,952 B2
(45) Date of Patent: Dec. 6, 2011

(54) PROACTIVE LOAD BALANCING

(75) Inventors: Won Suk Yoo, Redmond, WA (US); Anil K. Ruia, Issaquah, WA (US); Himanshu Patel, Redmond, WA (US); Ning Lin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 121 days.

(21) Appl. No.: 12/427,774

(22) Filed: Apr. 22, 2009

(65) Prior Publication Data

US 2010/0274885 A1    Oct. 28, 2010

(51) Int. Cl.
*G06F 15/173* (2006.01)
(52) U.S. Cl. ............... 709/226; 709/227; 710/36
(58) Field of Classification Search ............ 709/217, 709/223, 224, 226, 229, 241
See application file for complete search history.

(56) References Cited

U.S. PATENT DOCUMENTS

| | | | |
|---|---|---|---|
| 7,409,576 B2 | 8/2008 | Pomaranski et al. | |
| 2005/0021771 A1* | 1/2005 | Kaehn et al. | 709/228 |
| 2007/0094651 A1 | 4/2007 | Stephens et al. | |
| 2007/0094671 A1 | 4/2007 | Stephens et al. | |
| 2008/0059704 A1* | 3/2008 | Kavuri | 711/117 |
| 2008/0059747 A1 | 3/2008 | Burckart et al. | |
| 2008/0112326 A1 | 5/2008 | Krishnakumar et al. | |
| 2008/0170497 A1 | 7/2008 | Jeong et al. | |
| 2008/0195755 A1* | 8/2008 | Lu et al. | 709/241 |
| 2008/0285449 A1 | 11/2008 | Larsson et al. | |

OTHER PUBLICATIONS

Wu, et al., "Task-Pushing: A Scalable Parallel GC Marking Algorithm without Synchronization Operations", Retrieved at <<http://ieeexplore.ieee.org/stamp/stamp.jsp?arnumber=4228045&isnumber=4227918>>, IEEE Xplore, 2007, Jan. 22, 2009, pp. 10.
Vermorel, Joannes, "Sketch-based Distributed Garbage Collection, Theory and Empirical Elements", Retrieved at <<http://hal.archives-ouvertes.fr/docs/00/05/01/55/PDF/sketch-dgc-v5.pdf>>, pp. 1-8.
"GC RegisterForFullGCNotification Method", Retrieved at <<http://msdn.microsoft.com/en-us/library/system.gc.registerforfullgcnotification.aspx>>, Jul. 2008, pp. 7.

* cited by examiner

*Primary Examiner* — Jeffrey R Swearingen
(74) *Attorney, Agent, or Firm* — Boswell IP Law; J. Mason Boswell

(57) ABSTRACT

A load balancing system is described herein that proactively balances client requests among multiple destination servers using information about anticipated loads or events on each destination server to inform the load balancing decision. The system detects one or more upcoming events that will affect the performance and/or capacity for handling requests of a destination server. Upon detecting the event, the system informs the load balancer to drain connections around the time of the event. Next, the event occurs on the destination server, and the system detects when the event is complete. In response, the system informs the load balancer to restore connections to the destination server. In this way, the system is able to redirect clients to other available destination servers before the tasks occur. Thus, the load balancing system provides more efficient routing of client requests and improves responsiveness.

20 Claims, 4 Drawing Sheets

PROACTIVE LOAD BALANCING

BACKGROUND

In computer networking, load balancing is a technique to spread work between two or more computers, network links, CPUs, hard drives, or other resources, in order to achieve efficient resource utilization, high throughput, and low response time. Using multiple components with load balancing, instead of a single component, may increase reliability through redundancy. A dedicated program or hardware device (such as a multilayer switch) usually provides the balancing service.

One of the most common applications of load balancing is to provide a single Internet service from multiple servers, sometimes known as a server farm. Commonly load-balanced systems include popular web sites, large Internet Relay Chat networks, high-bandwidth File Transfer Protocol sites, NNTP servers, and DNS servers. For Internet services, the load balancer is usually a software program that is listening on the port where external clients connect to access services. The load balancer forwards requests to one of the "backend" servers, which usually replies to the load balancer. This approach allows the load balancer to reply to the client without the client ever knowing about the internal separation of functions. This approach also prevents clients from contacting backend servers directly, which may improve security by hiding the structure of the internal network and preventing attacks on the kernel's network stack or unrelated services running on other ports.

Load balancing is often used to implement failover—the continuation of a service after the failure of one or more of its components. The components are monitored continually (e.g., web servers may be monitored by fetching known pages), and when one becomes non-responsive, the load balancer is informed and no longer sends traffic to it. When a component comes back on line, the load balancer begins to route traffic to it again. For this reason, in order to ensure the continuation of the service, such environment is built with additional capacity to account for failure scenarios. This is much less expensive and more flexible than failover approaches where an administrator pairs a single "live" component with a single "backup" component that takes over in the event of a failure. In particular, rather than doubling the number of servers used, the administrator can include a certain percentage of redundancy less than one-to-one that is still adequate to handle common failures.

Load balancers use a variety of scheduling algorithms to determine which backend server to send a request. Simple algorithms include random choice or round robin. More sophisticated load balancers may take into account additional factors, such as a server's reported load, recent response times, up/down status (determined by a monitoring poll of some kind), number of active connections, geographic location, capabilities, or how much traffic the load balancer has recently assigned the server. High-performance systems may use multiple layers of load balancing.

Each of these load-balancing techniques considers the past or current health or status of the destination servers to determine where to route client requests. While this works well in some situations, unexpected loads may make the load balancing decision a poor one in light of more complete knowledge about the situation. For example, a server that has been idle for a while may seem like a good target to which to send future requests. However, that server may also decide to perform clean up tasks, such as disk defragmentation, garbage collection (e.g., clean up of runtime objects), server backup, and so forth, based on the previous idle state. In some cases, decisions based on past and current information may be too reactive, and in some cases too late based on conditions by the time the load balancer has routed requests to a particular destination server.

SUMMARY

A load balancing system is described herein that proactively balances client requests among multiple destination servers using information about anticipated loads or events on each destination server to inform the load balancing decision. By including information about what is about to happen in the decision, the system produces a balanced load that is more likely to be correct for a variety of foreseeable, though not typically considered, conditions. The system detects one or more upcoming events that will affect the performance and/or capacity for handling requests of a destination server. Upon detecting the event, the system informs the load balancer to drain connections around the time of the event. Next, the event occurs on the destination server, and the system detects when the event is complete. In response, the load balancing system informs the load balancer to restore connections to the destination server. In this way, the load balancing system is able to redirect clients to other available destination servers before the tasks occur. Thus, the load balancing system provides more efficient and proactive routing of client requests and improves responsiveness.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A load balancing system is described herein that proactively balances client requests among multiple destination servers using information about anticipated loads or events on each destination server to inform the load balancing decision. By including information about what is about to happen in the decision, the system produces a balanced load that is more likely to be correct for a variety of foreseeable, though not typically considered, conditions. The load balancing system includes a load balancer and one or more destination servers. The system detects one or more upcoming events that will affect the performance and/or capacity for handling requests of a destination server. For example, the system may detect that the destination server will soon perform garbage collection, which is typically memory and processor intensive, reducing the capacity for handling client requests.

Upon detecting the event, the load balancing system informs the load balancer to drain connections around the time of the event. For example, if the event will occur in one hour, then the load balancer may begin draining connections 10-15 minutes before the event. Next, the event occurs on the destination server. For example, the destination server performs the garbage collection detected in the example above. The system detects when the event is complete. For example, the destination server may provide a notification when the event is completed. In response, the system informs the load balancer to restore connections to the destination server. In this way, clients do not suffer poor responsiveness because the destination server is performing expected tasks. Rather, the system is able to redirect clients to other available destination servers before the tasks occur. Thus, the load balancing system provides more efficient and proactive routing of client requests and improves responsiveness.

Note that the system may differentiate between and handle scheduled tasks and unexpected tasks that are nevertheless predictable (or detectable in advance). For example, full garbage collection does not occur on a regular schedule, but can be detected in advance through a notification API. On the other hand, an antivirus scan or data backup often occurs on a regular schedule and can be detected by virtue of the schedule. For scheduled tasks, the system can determine a rolling load balancing schedule that will prevent any two destination servers from performing the scheduled tasks at the same time, while still allowing each destination server to perform the tasks regularly.

Figure 1:
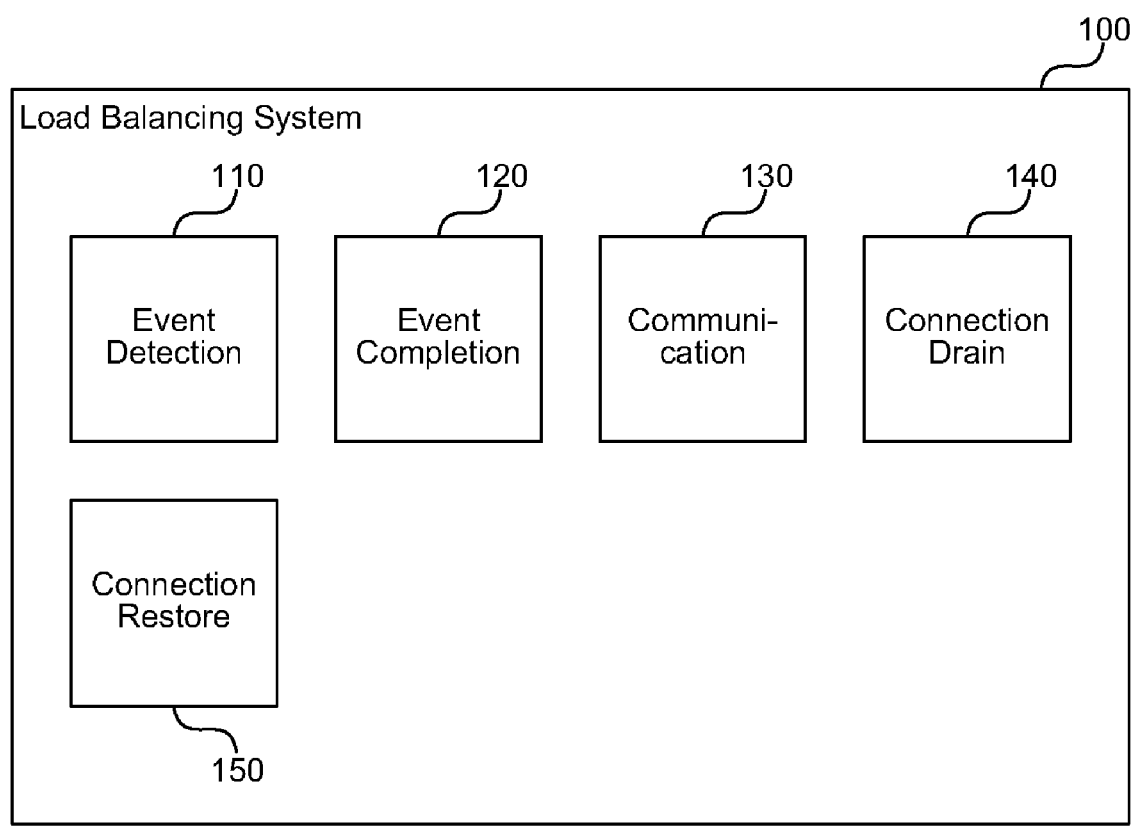
FIG. 1 is a block diagram that illustrates components of the load balancing system, in one embodiment.

FIG. 1 is a block diagram that illustrates components of the load balancing system, in one embodiment. The system 100 includes an event detection component 110, an event completion component 120, a communication component 130, a connection drain component 140, and a connection restore component 150. Each of these components is described in further detail herein. In some embodiments, the system 100 is provided as an add-on module to an existing web server system (e.g., Microsoft Internet Information Server (IIS) or Apache). For example, the Microsoft IIS Application Request Routing (ARR) add-on can be expanded to include the system 100 described herein. ARR is a proxy based request routing and load balancing module for IIS 7. ARR makes routing decisions at the application layer, based, for example, on HTTP request patterns, HTTP request headers, and server variables.

The event detection component 110 detects that an event is about to occur on a destination server that will affect the availability or capacity of the destination server for handling client requests. For example, the event detection component 110 may register for one or more system notifications that provide an indication of future scheduled events, such as operating system indications of maintenance (e.g., scheduled backup) or runtime indications of maintenance (e.g., scheduled garbage collection). The event detection component 110 receives notifications in advance of various events and communicates with the load balancer to ensure that the load balancer has information to route requests away from the destination server during the detected event.

The event completion component 120 receives notification when the event completes. For example, the operating system or other component may provide a completion notification on the same interface registered by the event detection component 110 for detecting scheduled events. The notification indicates that the event and corresponding burden on the destination server is complete, so that the destination server can once again handle a normal load of client requests.

The communication component 130 interfaces between the destination server and a load balancer. The load balancer provides load balancing based on one or more criteria to determine which destination servers to which to route received client requests. The load balancer may include an administrative interface with which the communications component 130 interacts. The communication component 130 provides an indication to the load balancer when the event detection component 110 detects events that will occur and will affect the availability of one or more destination servers. The communication component 130 may provide a corresponding indication to the load balancer when the event is complete so that the load balancer can adjust the routing of requests to the destination server on which the event occurred.

The connection drain component 140 concludes requests on a destination server and directs new requests away from the destination server. The connection drain component 140 can be located on each destination server or on the load balancer. When on each destination server, the connection drain component 140 receives indications from the event detection component 110 about upcoming events and directs the load balancer to drain client requests at an appropriate time through the communication component 130. When integrated with the load balancer the connection drain component 140 receives indications from each destination server about upcoming events and drains client connections within the load balancer directly at the appropriate time.

The connection restore component 150 restores requests to a destination server by enabling the destination server to receive requests from the load balancer. Like the connection drain component 140, the connection restore component 150 can be located on each destination server or on the load balancer. When on each destination server, the connection restore component 150 receives indications from the event completion component 120 about completed events and directs the load balancer, through the communication component 130, to resume sending client requests to the destination server. When integrated with the load balancer the connection restore component 150 receives indications from each destination server about completed events and restores client connections within the load balancer directly.

The computing device on which the system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
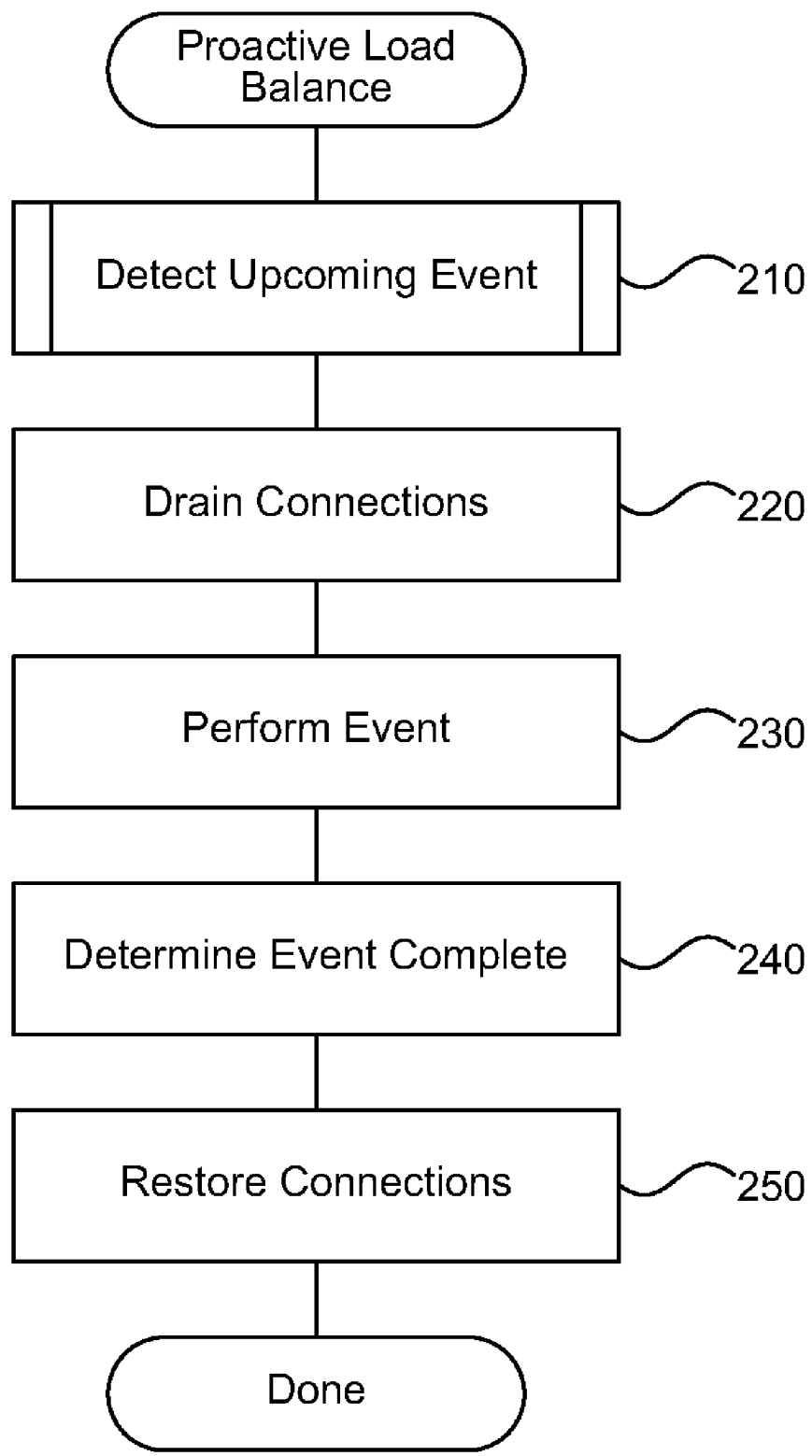
FIG. 2 is a flow diagram that illustrates the processing of the system to proactively balance the load of a destination server, in one embodiment.

FIG. 2 is a flow diagram that illustrates the processing of the system to proactively balance the load of a destination server, in one embodiment. Typically, a destination server performs these steps upon startup or on an ongoing basis when the server detects an event that will affect the future capacity of the server for handling client requests. Beginning in block 210, the system detects an upcoming event that will affect the future capacity of the server for handling client requests. For example, the system may register for notification when a scheduled task will occur or when a periodic task, such as full garbage collection, will occur. This process is described in further detail with reference to FIG. 3.

Continuing in block 220, the system drains existing connections to the destination server. For example, the system may call an application-programming interface (API) provided by a load balancer to drain connections from the destination server by no longer accepting requests from new clients. The destination server may provide the load balancer with a deadline at which the destination server expects reduced capacity. In addition, the destination server may provide the load balancer with an indication of the expected drop in capacity. For example, if the destination server expects a 50% drop in capacity in 10 minutes, then the destination server may provide this information to the load balancer. In response, the load balancer may route only half as many requests to the destination server until full capacity is restored.

Continuing in block 230, the system performs the upcoming event. For example, a schedule task (e.g., backup) may run on the destination server that reduces the destination server's capacity. Because the load balancer has been forewarned of the upcoming event, performing the event will not reduce the responsiveness experienced by clients that the load balancer has already routed to another destination server. In addition, the destination server may complete the event more quickly due to the reduced client load during the event. Continuing in block 240, the system detects that the event is complete, and that the capacity of the destination server for handling client requests is restored. For example, the destination server may register for and receive a notification that indicates that one or more schedule or periodic tasks are complete. Based on the completed event, the destination server may inform the load balancer to begin sending the destination server a normal load of client requests. In addition, the system may perform additional "smoke test" tasks (not shown) to ensure that the scheduled tasks have completed successfully before restoring the load to the destination server.

Continuing in block 250, the system restores connections to the destination server. For example, the destination server may call the API described herein provided by the load balancer for managing client requests to inform the load balancer that the destination server is available to handle client requests. In response, the load balancer includes the destination server in load balancing decisions. For example, if the load balancer uses a round robin approach, then during the event the load balancer may remove the destination server from the rotation and after the event is complete, the load balancer may add the destination server back into the rotation. In this way, clients are unaffected by the event, and the destination server can complete the event without interruption. Some tasks (such as installing a patch that involves a reboot of the destination server) will take the destination server completely offline. For these tasks, the load balancer will completely take the destination server out of the load balance rotation. For other tasks (such as garbage collection), the destination server is not offline but has reduced capacity for handling client requests. For these tasks, the destination server may still be in the load balance rotation, but at a reduced capacity. After block 250, these steps conclude.

Figure 3:
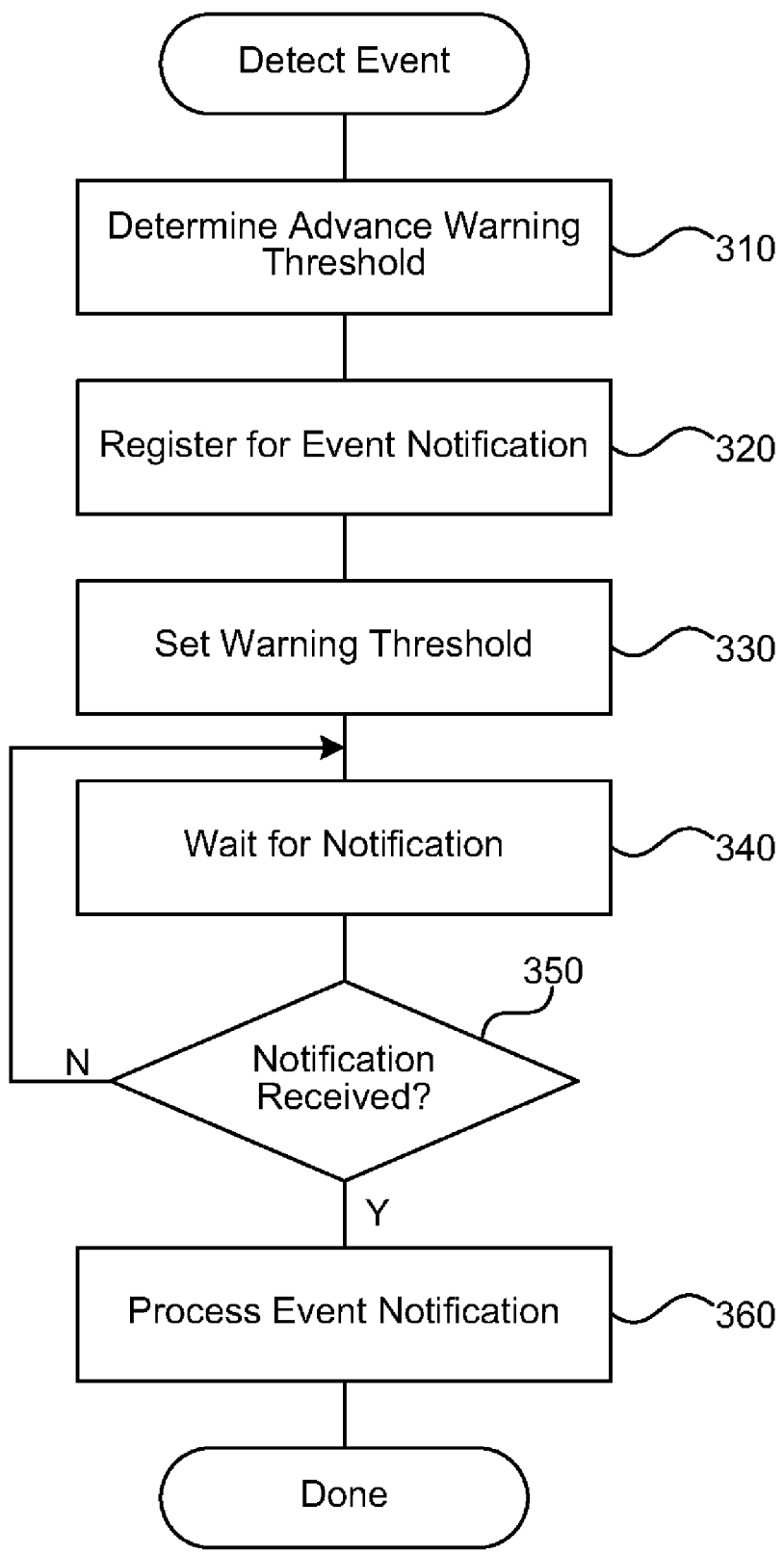
FIG. 3 is a flow diagram that illustrates the processing of the event detection component to detect a particular event, in one embodiment.

FIG. 3 is a flow diagram that illustrates the processing of the event detection component to detect a particular event, in one embodiment. The system may perform these steps for many types of events, some of which provide a configurable advanced warning of when the event will occur or is likely to occur. Beginning in block 310, the component determines an amount of advance warning before an event occurs on a destination server such that the warning will provide enough time to balance requests to other servers, wherein the event will affect the capacity of the destination server for handling client requests. For example, the component may base the amount on historical information about previous requests or occurrences of the event. As another example, the component may determine the amount based on the expected duration of current client sessions so that the determined amount gives at least some clients times to complete their sessions with the destination server.

Continuing in block 320, the component registers for an event notification that provides advance notification of when the event will occur. For example, the source of the event may provide an API for registering for notification of the event and the API may include a parameter for the amount of advance warning that the caller requests. In the case of garbage collection, for example, a garbage-collecting component may determine in advance when a full garbage collection will occur and may notify registered callers at a requested advance interval before the full garbage collection occurs. Continuing in block 330, the component sets a warning threshold based on the determined amount of advance warning. As noted in the previous example, the API provided by an event source may allow a caller to request notification and specify a threshold in a single call. Other event sources may not provide the ability to specify the amount of advance warning and the component may provide a layer for receiving the notification when the event source fires the notification and delaying notification to other components of the system until the requested interval transpires.

Continuing in block 340, the component waits to receive the event notification. For example, the component may call an operating system provided function for blocking waiting for an event or may perform other tasks and periodically poll the event source to determine whether the notification is available. Because the system can operate with many types of events and event sources, the system may receive information about some events in one way and other events in other ways. Continuing in decision block 350, if the component has received notification of the event, then the component continues at block 360, else the component loops to block 340 to continue waiting for the event notification. For example, the component may register a handler function with the event source when calling the event registration API, and the component may determine that the notification has been received when the event source invokes the provided handler function. Continuing in block 360, the component processes the received event notification. For example, the component may invoke the load balancer API described further herein to inform the load balancer that the destination server will be unavailable due to the event. After block 360, these steps conclude.

Figure 4:
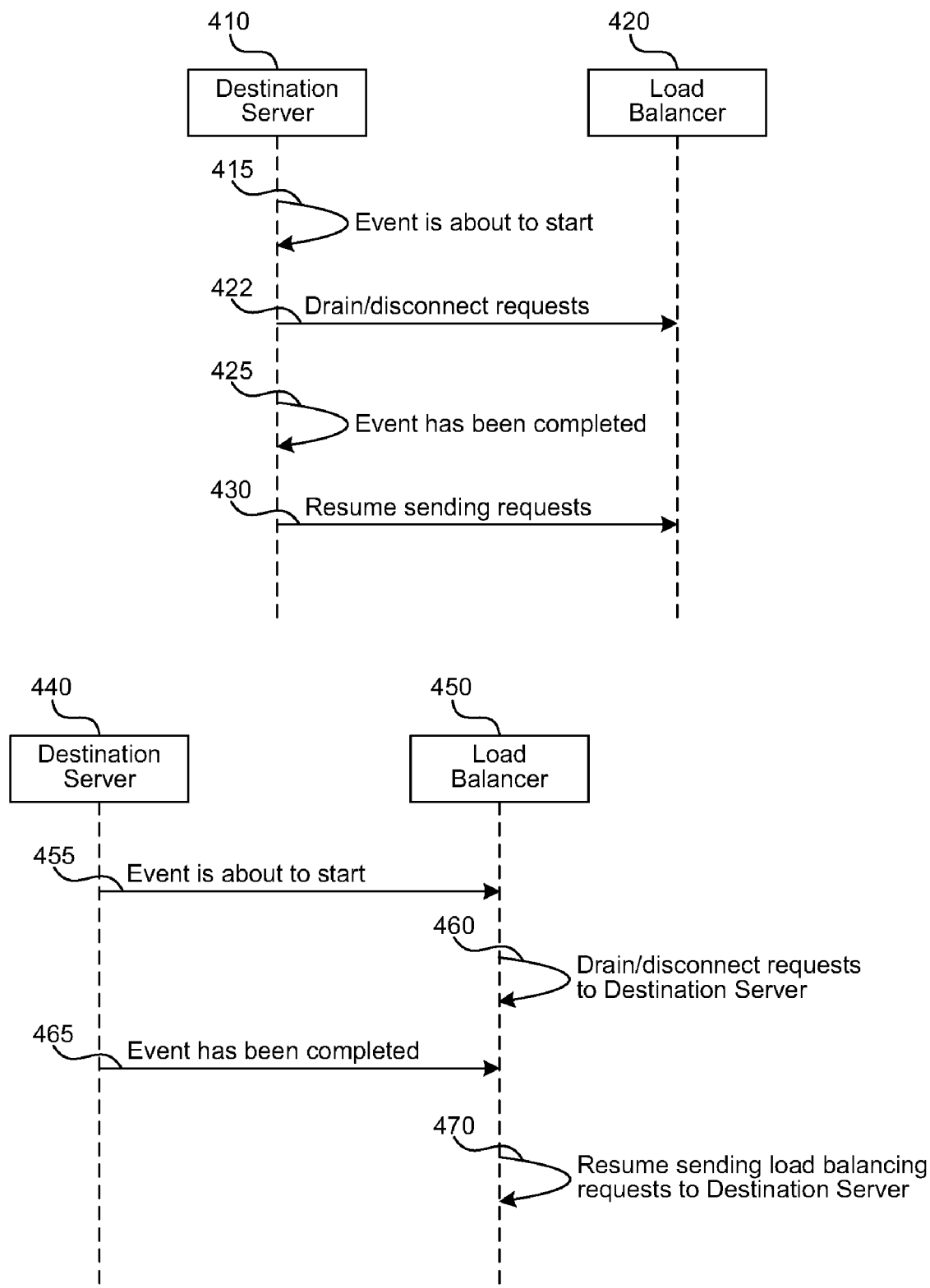
FIG. 4 is a sequence diagram that illustrates two alternative models for communication between a destination server and a load balancer according to the techniques described herein, in one embodiment.

FIG. 4 is a sequence diagram that illustrates two alternative models for communication between a destination server and a load balancer according to the techniques described herein, in one embodiment. In the first model, an destination server 410 communicates with a load balancer 420. The load balancer 420 provides remote-able APIs for draining and restoring requests to the destination server 410. In the first model, the destination server 410 is smart and determines when to call the load balancer 420 APIs. The destination server 410 receives a notification 415 that an event is about to start that will affect the capacity of the destination server 410 for receiving client requests. In response to the notification 415, the destination server 410 calls the load balancer 420 API for draining requests by sending a remote request 422 to the load balancer 420. Later, the destination server 410 receives a notification 425 that the event has completed (e.g., by finishing a particular task). In response, the destination server 410 calls the load balancer 420 API for restoring requests by sending another remote request 430. Before restoring connections, the system may also perform smoke testing on the destination server to ensure that the event completed and that the destination server is back to full capacity.

In the second model, an destination server 440 communicates with a load balancer 450 that is smart and makes determinations about how to manage requests to destination servers based on events received from the destination servers. The destination server 440 sends a notification 455 that an event is about to start that will affect the capacity of the destination server 440 and provides the event directly to the load balancer 450. In response, the load balancer 450 determines that the load balancer 450 will drain requests to destination server 440 and provides an internal indication 460 to do so. Later, the destination server 440 generates a notification 465 that the event has completed and provides the event directly to the load balancer 450. In response, the load balancer 450 determines that destination server 440 is once again available for handling client requests and provides an internal indication 470 to restore connections to the destination server 440. Before restoring connections, the system may also perform smoke testing on the destination server to ensure that the event completed and that the destination server is back to full capacity. The system can operate according to either of these two models as well as other variations (e.g., a hybrid approach between the two). The choice between these models may be affected by a particular administrator's preferences for modifying the destination server or load balancer or the load that each model places on each of the servers. For example, performing too many operations on the load balancer may negatively affect the load balancer's performance, leading an administrator to prefer the first model. On the other hand, a desire for centralized control of routing decisions may lead an administrator to choose the second model that includes a smarter load balancer.

In some embodiments, the load balancing system detects garbage collection events using a runtime-provided notification. For ASP.NET applications that are running on the Microsoft NET Framework 3.5, there is a notification provided before full garbage collection (GC) is about to take place. Applications can register to receive the notification by calling a GC.RegisterForFullGCNotification method. The configuration of this method allows the application to request how far in advance the runtime will send the notification before the full garbage collection. During full garbage collection, the server will most likely respond slower than usual because of the garbage collection process. The bigger the server's memory, the more resource intensive the full garbage collection process can be. By subscribing to this notification and tweaking how far in advance the notification is sent, the load balancing system can preemptively reduce or even stop load balancing requests to a destination server that is about to start the full garbage collection. Effectively, this technique load balances the requests proactively in anticipation of the degradation in server performance caused by full garbage collection.

In some embodiments, the load balancing system uses an API provided by the load balancer to manage requests to a destination server. For example, the load balancer may provide various APIs for disconnecting client connections. There are three levels of disconnecting connections: draining connections, disconnecting gracefully, and disconnecting forcefully. When draining connections, if a client has already established a session with the server, the server honors the session and requests from the client continue to be forwarded to the server. However, if the client has not established the session, then the load balancer routes the client to another server. The system uses this option to avoid disturbing clients with existing sessions while reducing the amount of traffic that is sent to the server. The term "draining" is derived from this concept.

Disconnecting gracefully refers to a mode in which sessions are ignored (i.e., even a client that has established a session with the server will be re-routed). However, the disconnect is graceful in that requests and responses that are "in-flight" are allowed to complete. This mode is more "forceful" than draining connections. Disconnect forcefully refers to a mode in which sessions are also ignored. In addition, requests and responses that are "in-flight" are also disconnected immediately. This is the most "forceful" mode but may be used for long-lived connections (such as a client that is watching an hour-long movie). The load balancer may provide APIs for performing each type of disconnect, and the destination server may select an appropriate API during proactive load balancing based on the urgency of the expected event and whether there is time to allow a graceful disconnect with clients.

From the foregoing, it will be appreciated that specific embodiments of the load balancing system have been described herein for purposes of illustration, but that various modifications may be made without deviating from the spirit and scope of the invention. For example, although full garbage collection has been used in examples as one event for which the system may provide proactive load balancing, those of ordinary skill in the art will recognize various common events that affect the performance of a server and whose occurrence can be predicted with sufficient certainty to proactively make load balancing decisions. For example, events may include data backup, anti-virus scanning, indexing content, and so forth. Accordingly, the invention is not limited except as by the appended claims.

I claim:

1. A computer-implemented method for proactively balancing client requests between multiple destination servers, the method comprising:

detecting at a destination server an upcoming event that will affect the future capacity of the destination server for handling client requests;

sending from the destination server a direct request to the load balancer to drain existing connections to the destination server;

performing at the destination server one or more tasks associated with the upcoming event;

detecting within the destination server that the event is complete, and that the capacity of the destination server for handling client requests is restored; and sending from the destination server a direct request to the load balancer to restore connections to the destination server, wherein the preceding steps are performed by at least one processor.

2. The method of claim 1 wherein detecting an upcoming event comprises registering to be notified when a scheduled task will occur and receiving a notification.

3. The method of claim 1 wherein detecting an upcoming event comprises registering for a notification from a runtime, wherein the notification provides an indication before the runtime performs full garbage collection.

4. The method of claim 1 wherein draining existing connections comprises invoking a remote load balancer application programming interface (API) to manage requests to the destination server.

5. The method of claim 1 wherein draining existing connections comprises informing a load balancer whether connections should be drained, disconnected gracefully, or disconnected forcefully.

6. The method of claim 1 wherein draining existing connections comprises informing a load balancer of a deadline at which the destination server expects reduced capacity.

7. The method of claim 1 wherein draining existing connections comprises informing a load balancer of an indication of the expected drop in capacity.

8. The method of claim 1 wherein performing one or more tasks comprises running a scheduled task associated with the event on the destination server that reduces the destination server's capacity.

9. The method of claim 1 wherein the destination server completes the one or more tasks associated with the event more quickly due to a reduced client load during the event from draining the connections and informs the load balancer to restore connections to the destination server sooner in response.

10. The method of claim 1 wherein detecting that the event is complete comprises registering for and receiving a notification that indicates that the one or more tasks are complete and performing one or more smoke tests that verify that the destination server capacity is restored.

11. The method of claim 1 wherein restoring connections to the destination server comprises invoking a load balancer application programming interface (API) to inform the load balancer that the destination server is available to handle client requests.

12. A computer system for managing routing of requests among multiple destination servers based on future events on a destination server, the system comprising:

a processor and memory configured to execute software instructions;

an event detection component operating on the destination server and configured to detect that an event is about to occur on the destination server that will affect the availability of the destination server for handling client requests;

an event completion component operating on the destination server and configured to receive a notification after the event completes;

a communication component configured to interface directly between the destination server and a load balancer, wherein the load balancer provides load balancing based on one or more criteria to determine a destination server among multiple destination servers to which to route each received client request;

a connection drain component configured to conclude requests on the destination server and direct new requests away from the destination server before the event; and a connection restore component configured to restore requests to a destination server by enabling the destination server to receive requests from the load balancer.

13. The system of claim 12 wherein the event detection component is further configured to register for one or more notifications that provide an indication of future scheduled events.

14. The system of claim 12 wherein the event detection component is further configured to receive notifications in advance of various events and communicate with the load balancer to ensure that the load balancer has information to route requests away from the destination server during a detected event.

15. The system of claim 12 wherein the event completion component is further configured to receive notification that the event and corresponding burden on the destination server is complete, so that the destination server can once again handle client requests.

16. The system of claim 12 wherein the communication component is further configured to invoke an administrative interface of the load balancer to provides indications to the load balancer when the event detection component detects events that will occur and will impact the availability of one or more destination servers.

17. The system of claim 12 wherein the communication component provides a completion indication to the load balancer after the event is complete so that the load balancer can adjust the routing of requests to the destination server on which the event occurred.

18. The system of claim 12 wherein the connection drain component receives indications from the event detection component about upcoming events and directs the load balancer to drain client requests before the event through the communication component.

19. The system of claim 12 wherein the connection restore component is further configured to receive indications from the event completion component about completed events and direct the load balancer through the communication component to resume sending client requests to the destination server.

20. A computer-readable storage device comprising instructions for controlling a computer system to proactively balance client requests between multiple destination servers, wherein the instructions, when executed, cause a processor to perform actions comprising:

detecting at a destination server an upcoming event that will affect the future capacity of the destination server for handling client requests;

sending from the destination server a direct request to the load balancer to drain existing connections to the destination server;

performing at the destination server one or more tasks associated with the upcoming event;

detecting within the destination server that the event is complete, and that the capacity of the destination server for handling client requests is restored; and sending from the destination server a direct request to the load balancer to restore connections to the destination server.

* * * * *